United States Patent

Sharpe

[11] Patent Number: 6,085,069
[45] Date of Patent: Jul. 4, 2000

[54] MESSAGE TRANSMISSION SYSTEM, A METHOD OF OPERATING THE MESSAGE TRANSMISSION SYSTEM, AND A PRIMARY STATION THEREFOR

[75] Inventor: Anthony K. Sharpe, Cambridge, United Kingdom

[73] Assignee: U.S. Philips Corporation, New York, N.Y.

[21] Appl. No.: 09/034,442

[22] Filed: Mar. 4, 1998

[30] Foreign Application Priority Data

Mar. 11, 1997 [GB] United Kingdom ............... 9704951

[51] Int. Cl.$^7$ .................................................. H04B 7/00
[52] U.S. Cl. .................................. 455/31.3; 455/38.1
[58] Field of Search ................................. 455/31.1, 31.2, 455/31.3, 51.1, 38.1; 379/142, 67.1, 58; 340/825.44; 370/312, 313, 314

[56] References Cited

U.S. PATENT DOCUMENTS

| 4,383,257 | 5/1983 | Giallanza et al. ........................ 455/31 |
| 4,994,797 | 2/1991 | Breeden .................................. 379/142 |
| 5,422,733 | 6/1995 | Merchant et al. ...................... 455/31.1 |

FOREIGN PATENT DOCUMENTS

| WO8604476 | 7/1986 | WIPO ............................. H04Q 7/02 |
| WO9015511 | 12/1990 | WIPO ............................. H04Q 7/00 |
| WO9502873 | 1/1995 | WIPO ............................. G08B 5/22 |

*Primary Examiner*—Thanh Cong Le
*Attorney, Agent, or Firm*—Jack D. Slobod

[57] ABSTRACT

A message transmission system, such as a paging system, provides message compression through the use of corresponding memories or memory areas in a primary station and a secondary station storing identically the most frequently used n items of numeric only or alpha-numeric data. The contents of the memories are updated dynamically to reflect changes in the most frequently used items by the primary station examining messages to be sent to a particular secondary station to see if an item is being used more frequently than one of those stored, in which case the primary station initiates a reprogramming message which is sent to the secondary station. In response to receipt of the reprogramming message, the particular secondary station updates its memory and acknowledges to the primary station that it has done so, and upon receipt of the acknowledgement, the primary station correspondingly updates its memory. The message compression technique may also be applied to frequently used phrases and also to complex graphical data which it is more efficient to store in the primary and secondary stations and to transmit a memory location indicator.

10 Claims, 3 Drawing Sheets

MESSAGE TRANSMISSION SYSTEM, A METHOD OF OPERATING THE MESSAGE TRANSMISSION SYSTEM, AND A PRIMARY STATION THEREFOR

BACKGROUND OF THE INVENTION

The present invention relates to a message transmission system, to a method of operating the message transmission system and to a primary station therefor. The invention has particular application to point-to-point telecommunications systems such as digital wide area paging and cellular and cordless telephone systems.

For convenience of description the present invention will be described to digital wide area paging with particular reference being made to the well known CCIR Radiopaging Code No. 1, otherwise known as POCSAG. However it must be understood that the present invention is independent of any specific code or protocol. POCSAG has provision for transmitting numeric only and alpha-numeric messages and a typical transmission comprises an address code word and one or more concatenated message code words. Address and message code words are 32 bits long. In the case of a message code word only 20 of the 32 bits are allocated to data. If a numeric only message is being transmitted then each digit is encoded as a 4 bit hexadecimal character so that each message code word can comprise a maximum of 5 digits, which means that to transmit an eleven digit trunk code or telephone number requires a total of 3 message code words plus an address code word. In the case of an alpha-numeric message, each digit, letter or space is encoded as ASCII seven bit character which means that only 2 complete characters plus 6 bits of a third character or 6 bits comprising the end of one character and the beginning of another character can be sent in a single message code word.

In the interests of maximising system capacity Patent Specification WO95/02873 discloses a method of message compression in which a paging system controller (or primary station) has a dictionary stored in a non-volatile memory and each pager (or secondary station) has the identical dictionary stored in it. In operation if the pager system controller detects that one or more words contained in a message to be transmitted are in the dictionary then rather than encode the or each word using ASCII characters, the location of the word in the dictionary is sent as say 2 seven bit characters. The pager on decoding these two characters, reads out the word from its dictionary and substitutes it for the two characters. This principle can be extended to standard phrases, such as "for example", and frequently used short messages. Compression increases the overall system capacity.

A typical numeric only pager message is an indication of a telephone number which the pager user is being requested to ring. Instead of having to transmit each digit of a telephone number as 4 bit hexadecimal character it has been proposed that the ten most frequently requested telephone numbers that a pager user is required to call are prestored in a non-volatile memory in the pager, each number being identifiable by a memory location reference indication. The paging system controller also has a non-volatile memory in which for the same pager, the same telephone numbers and location reference indicia are stored. Thus when the pager system controller calls one of these prestored numbers, all it has to do is to transmit the address code word and one concatenated message code word giving the memory location reference indicia. At the pager the pre-stored telephone number is read-out and displayed. On the basis of a simple comparison of requiring 4 code words to send an address and a telephone number (as 4 bit hexadecimal) and 2 code words to send an address and a telephone number in a compressed form, the capacity of the system is doubled.

A drawback to the system as described is that it is inflexible in so far that if due to a change in circumstances a user changes his frequently used work telephone number, the paging system controller has to send the new number in an uncompressed form. If there are a lot of changes across the entire system, then the value of the compressed format diminishes. Also in the case of alpha-numeric data, it is difficult and relatively expensive to produce custom dictionaries for each individual user.

OBJECTS AND SUMMARY OF THE INVENTION

An object of the present invention is to optimise the use of the capacity of a communications system.

According to one aspect of the present invention there is provided a method of operating a message transmission system comprising a primary station transmitting point-to-point messages over a communications link to at least one secondary station, the at least one secondary station receiving messages from said primary station and recovering the messages, the at least one secondary station having non-volatile memory means for storing n (where n is an integer) most frequently received items of information from the primary station, each item being identified in a received message by memory location reference indicia, said primary station having non-volatile storage means for storing, for the at least one secondary station, said n most frequently used items of information and their associated memory location reference indicia, said primary station, whenever appropriate, transmitting memory location reference indicia to said at least one secondary station in place of said of the item of information, wherein said primary station monitors the frequency of use of items of information transmitted to the at least one secondary station, and determines if the frequency of use of said items of information monitored is different from the stored n most frequently use items and in response thereto the primary station transmits a reprogramming message to the at least one secondary station for updating the items of information stored in its memory means and also updates its own storage means to correspond with the memory means in the at least one secondary station.

According to a second aspect of the present invention there is provided a method of operating a message transmission system comprising a primary station transmitting point-to-point messages over a communications link to at least one secondary station, the at least one secondary station receiving messages from said primary station and recovering the messages, the at least one secondary station having non-volatile memory means for storing n(where n is an integer) most frequently received items of information from the primary station, each item being identified in a received message by memory location reference indicia, said primary station having non-volatile storage means for storing, for the at least one secondary station, said n most frequently used items of information and their associated memory location reference indicia, said primary station, whenever appropriate, transmitting memory location reference indicia to said at least one secondary station in place of said of the item of information, wherein said primary station monitors the frequency of use of items of information transmitted to the at least one secondary station, and determines if the frequency of use of said items of information monitored is different from the stored n most frequently used items and in response thereto the primary station transmits a reprogramming message to the at least one secondary station for updating the items of information stored in its memory means and also updates its own storage means to correspond with the memory means in the at least one secondary station.

According to a third aspect of the present invention there is provided a primary station for use in a message transmission system comprising a primary station for transmitting point-to-point messages over a communications link and at least one secondary station having means for receiving messages from said primary station, said primary station having non-volatile storage means for storing, for the at least one secondary station, n most frequently used items of information and their associated memory location reference indicia, said primary station, whenever appropriate, transmitting memory location reference indicia to said at least one secondary station in place of said of the item of information, said primary station having means for monitoring the frequency of use of items of information transmitted to the at least one secondary station, means for determining if the frequency of use of said items of information monitored is different from the stored n most frequently use items and in response thereto the primary station transmits a reprogramming message to the at least one secondary station for updating the items of information stored in its memory means and also updates its storage means to correspond with that in the at least one secondary station.

By means of the present invention a primary station is able to update the items of information stored without the intervention of the user of the secondary station. Also there is no restriction as to the frequency at which updating is done.

When implementing the invention, it is preferred that the secondary station be able to acknowledge automatically, without user intervention, receipt of the updated list of items of information.

The items of information may be numeric only, alpha-numeric or graphical bit patterns. In the latter cases the primary station may determine from the paging messages that certain words (including proper nouns) and/or graphical patterns occur sufficiently frequently or are sufficiently complex that it is efficient to store them dynamically and use a compressed format for transmitting them.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENTS

Figure 1:
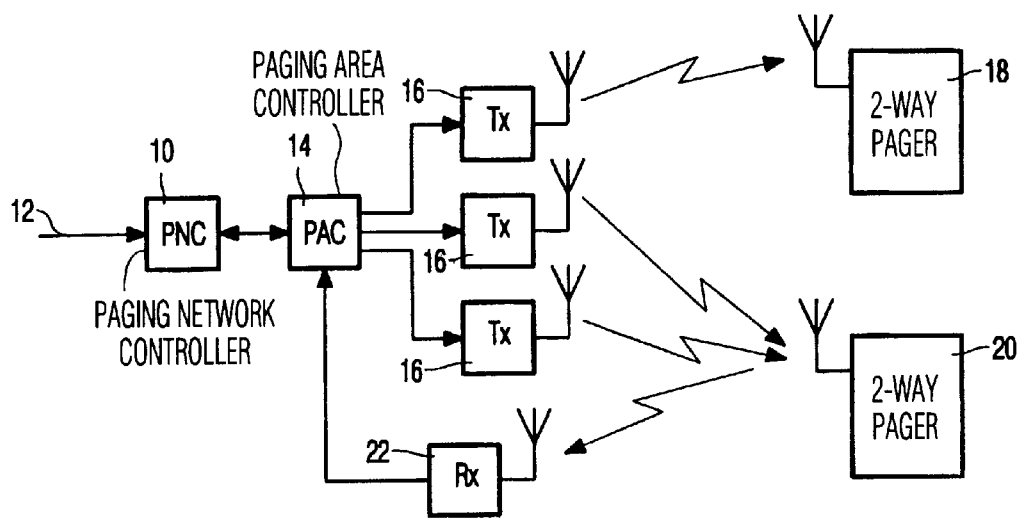
FIG. 1 is a block schematic diagram of a two-way paging system.

Referring to FIG. 1, the message transmission system comprises a paging network controller (PNC)10 having a message entry port 12 which receives pager addresses and associated messages from an operator equipped with a personal computer (PC) or directly from a subscriber having a PC and a modem. The PNC 10, which comprises directories containing information such as pager radio identity codes (RICs) areas to be paged, frequencies, pager types, prevailing protocols, for example POCSAG (or CCIR Radiopaging Code No. 1) and ERMES, and status of the pagers, assembles the messages and their associated RICs together with other relevant information into data packets which are forwarded to a paging area controller (PAC 14) which formats the RICs and associated messages into a format which can be transmitted by base station transmitters (or transmitter section of a base station transceiver) 16 to two-way pagers 18, 20 respectively, by way of a down-link. The PNC10 also analyses each message item by item and compares the frequency of occurrence and/or the complexity of numeric, alpha-numeric and/or graphical items with a list of the n, where n is an integer, most frequently sent items to a particular addressee and notes these. The PNC10 may also analyse messages to a particular addressee to see if there is a repetition of phrases and/or graphical data which it would be more efficient to store and transmit in a compressed format.

If a two-way pager 20 identifies that a message is being transmitted having its RIC, it receives the message and decodes it. The down-link message asks for an automatic response confirming the correct receipt of the message or otherwise. Subsequently if the user wishes to send a brief response then, by means of an integral key pad, the user selects a response and when invited by the PAC 14 it transmits its response by way of an up-link. The response signals may be sent simultaneously as pseudo-random data sequences (PRDS), the actual sequences may be precoded or selected in response to the down-link message.

One or more receivers (or receiver sections of a transceiver) 22 are provided for receiving the responses and for relaying them to the PAC 14 in which they are decoded and sent as data packets to the PNC 10. The PNC 10 comprises means for analysing the signals and for matching the responses with the messages transmitted on the down-link.

Those responses which are matched are relayed to the respective original message generators in any suitable form, for example by e-mail or by transmission as one-way paging messages. Alternatively the responses are sent to a message answering service operated by the paging network. In either case an acknowledgement is sent to the respective 2-way pager 20.

Figure 2:
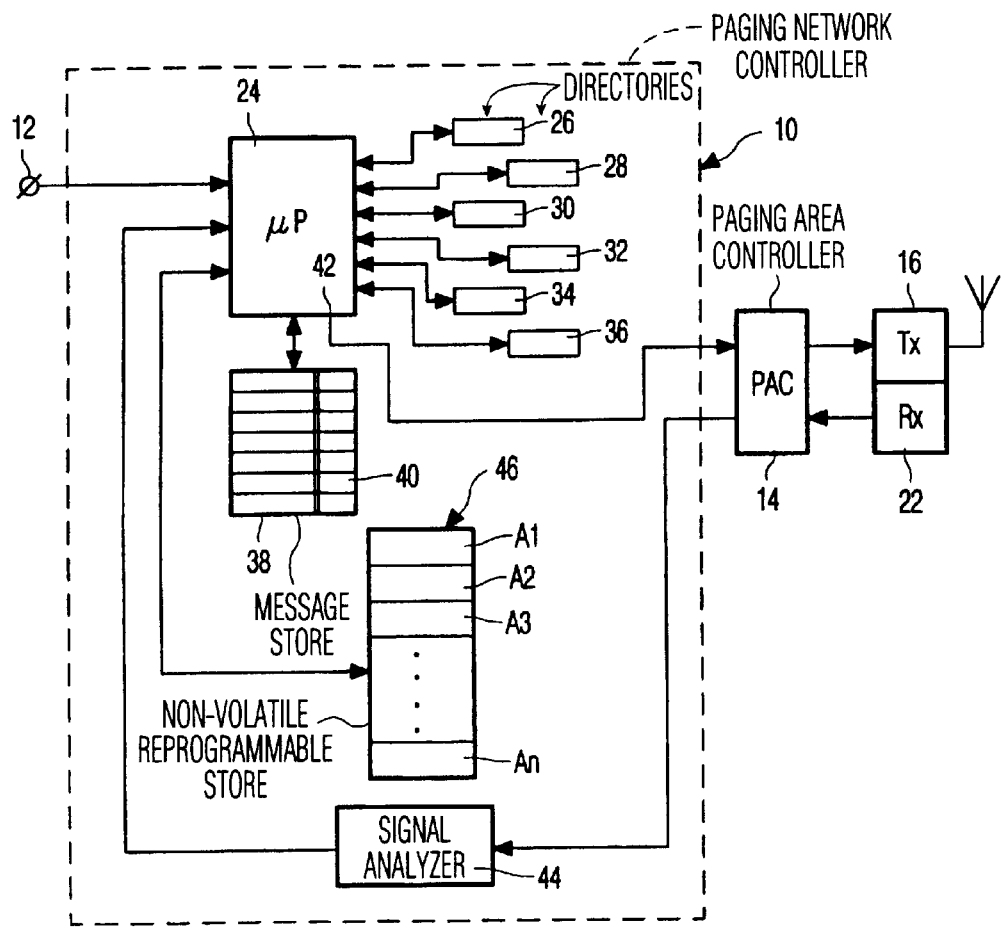
FIG. 2 is a block schematic diagram of the PNC10.

FIG. 2 shows in block schematic form a PNC10 coupled to a PAC 14 and a base station transmitter 16 and a receiver 22. The entry port 12 is coupled to a microprocessor 24 to which are connected directories 26 to 36 relating respectively to RICs, paging areas, frequencies, pager types, prevailing protocols and status. A message store 38 is coupled to the microprocessor 24 for storing messages as they are received at the entry port 12. The store 38 has an area 40 for storing indications confirming that a response to a respective message has been received and acknowledged. An output 42 from the microprocessor 24 is coupled to the PAC 14 to supply data packets to be formatted prior to being transmitted by the transmitter 16. A further nonvolatile, reprogrammable store 46 (or area of a larger memory) is provided for storing in respective areas A1, A2, A3 to An the most frequently used numeric data, alpha-numeric data, and/or phrases or complex graphical data when sending a message to a particular RIC. A memory location reference indicator is assigned to each item of data and when this item of data is included in a message to a particular pager, the bit-wise more compact memory location reference indicator is substituted. The data in the areas A1 to An can be overwritten in order to update the items of data which are stored in order to reflect a change in circumstances of the user. The updating operation will be described later.

Responses received by the receiver 22 are relayed to a signal analyser 44 by way of the PAC 14. As each response is analysed successfully, it is forwarded to the microprocessor 24 for checking that they are acknowledgements or for matching with the messages in the store 38. Once messages have been matched, the microprocessor arranges for an acknowledgement of the message to be transmitted when sending the next invitation signal on the down-link. At the appropriate moment the recipients of the responses are informed, for example by e-mail or one-way paging message, or the responses are stored together with the respective pager number so that a subscriber can interrogate the store at his or her convenience. Once the microprocessor 24 has decided that for all practical purposes all the responses have been received, it erases the messages in message store 38 in readiness for receiving more messages by way of the entry port 12. More conveniently the store 38 can comprise two halves with one half handling the acknowledgements of the messages already sent on the down-link and the other half storing messages to be sent.

Figure 3:
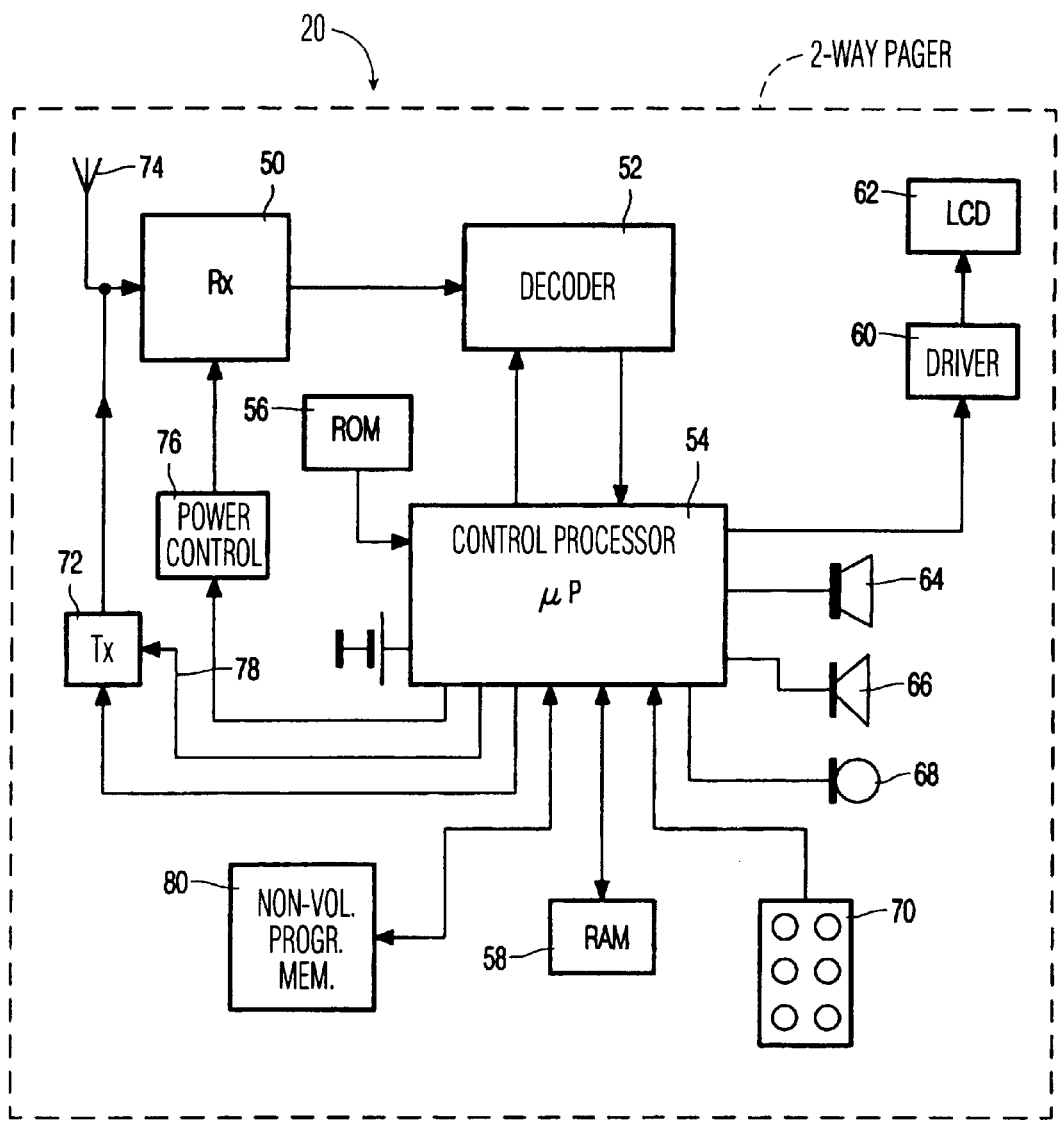
FIG. 3 is a block schematic diagram of a 2-way pager.

Referring to FIG. 3, the pager 20 comprises a receiver 50 connected to a decoder 52 which in turn is coupled to a control processor 54. The processor 54 operates in accordance with a program stored in a read-only memory 56. The processor also includes an address store (not shown) which contains the unique addresses of that pager. In the event of the pager receiving a message then this is stored in a random access memory 58. The messages can be displayed subsequently on a LCD panel 62 which has its associated driver 60 coupled to the control processor 54. Annunciating devices which may comprise an acoustic transducer 64, a light emitting transducer 66 and a vibrator 68 are coupled to the control processor 54. A keypad 70 provides a man machine interface whereby a user can instruct the processor to carry out various functions, for example to display a stored message on the panel 62. A transmitter 72 is coupled to an output of the processor 54 and to an antenna 74. A receiver power control stage 76 is coupled between the processor 54 and the receiver 50 in order to practice battery conservation in accordance with the provisions of the paging protocol being followed. In the event of the pager sending response signals as PRDS signals then the control processor 54 comprises means for determining the sequence to be transmitted having regard to the identity of the pager and/or information in the original down-link message. The PRDS is then relayed to the transmitter 72 for onward transmission. If as an option power control is to be applied to the transmitter 72 then a power control signal is supplied by the processor 54 through a control line 78. A non-volatile, reprogrammable memory 80, such as a RAM or EEPROM, is coupled to the processor 54 and stores a duplicate of the data and memory location reference indicia which is held in the corresponding area A1 to An of the store 46 (FIG. 2) in the PNC10. The contents of the memory 80 can be updated by an over-air reprogramming message.

Further the signals transmitted on the up-link may also comprise requests for services, such as registration, and accordingly the present invention is equally applicable to processing such requests for services in the same way as a response with the exception there will be no match with an outgoing message.

The present invention is primarily concerned with increasing system capacity by use of signal compression techniques which are known per se from Patent Specification WO95/02873. Essentially the PNC10 and the pagers 18, 20 each include memories 46, 80, respectively, containing identical dictionaries and when sending an alpha-numeric message dictionary references are transmitted wherever possible rather than the word itself encoded as ASCII characters. With numeric only messages which typically comprise a telephone number, a large memory would be required to stored a complete telephone directory. However as with telephones it is possible to pre-store say the 10 most used numbers that a pager user is required to contact. In order for these numbers to be transmitted in a compressed format then it is necessary for a user's numbers to be stored by the PNC10 and in the user's pager, that is in the memories 46 (FIG. 2) and 80 (FIG. 3). However pre-storing numbers or words assumes that there is no need to change them and over a period of time this could lead to obsolescence in the data stored with implications on the capacity of the system.

The method in accordance with the present invention enables the most frequently used numerical data, alpha-numeric data, and phrases or complex graphical data to be stored by the PNC10 and the pagers 18, 20 and for updating of the memories by over the air programming/reprogramming without requiring any intervention by the pager user or he or she being aware that an up-date has taken place. Although in theory the pagers could be one-way pagers there is a risk that due to say a fade, a pager does not receive an up-date message with the result that future compressed message will not be decoded correctly. Using a two-way pager enables an acknowledgement to be sent automatically, with the user being aware, on an up-link to the PNC10. The acknowledgement can be sent in respect of each item of data being updated or in response to a reprogramming message containing several updates for the addressed pager.

The description so far has specifically mentioned telephone numbers but the invention may be applied to compressing alpha-numeric data by arranging a portion of the dictionary memory to be dynamically updated so as to contain the most frequently used 128 words or phrases with the result that instead of transmitting the word or phrase as ASCII characters it can be sent as a seven bit dictionary identifier. The pager can also contain another area with less frequently used words which have to be identified with two seven bit ASCII characters. In creating the most frequently used words and/or phrases dictionary, the paging network controller can monitor what words and/or phrases are being used in a communication to a particular subscriber, for example mechanical engineering terminology, electrical engineering terminology and medical terminology and update the dictionary over the air using the technique of transmitting the word and/or phrase and memory location identity and receiving an automatic acknowledgement back from the pager. In a further variant if complex graphical data is detected then this can be stored so that it can be recalled in response to the receipt of a memory identifier in a message.

In the event of a pager finding that the data stored in its memory is lost, its controller can generate automatically an up-link message requesting the PNC10 to send a reprogramming message in which any data remaining in the memory 80 is over-written.

Figure 4:
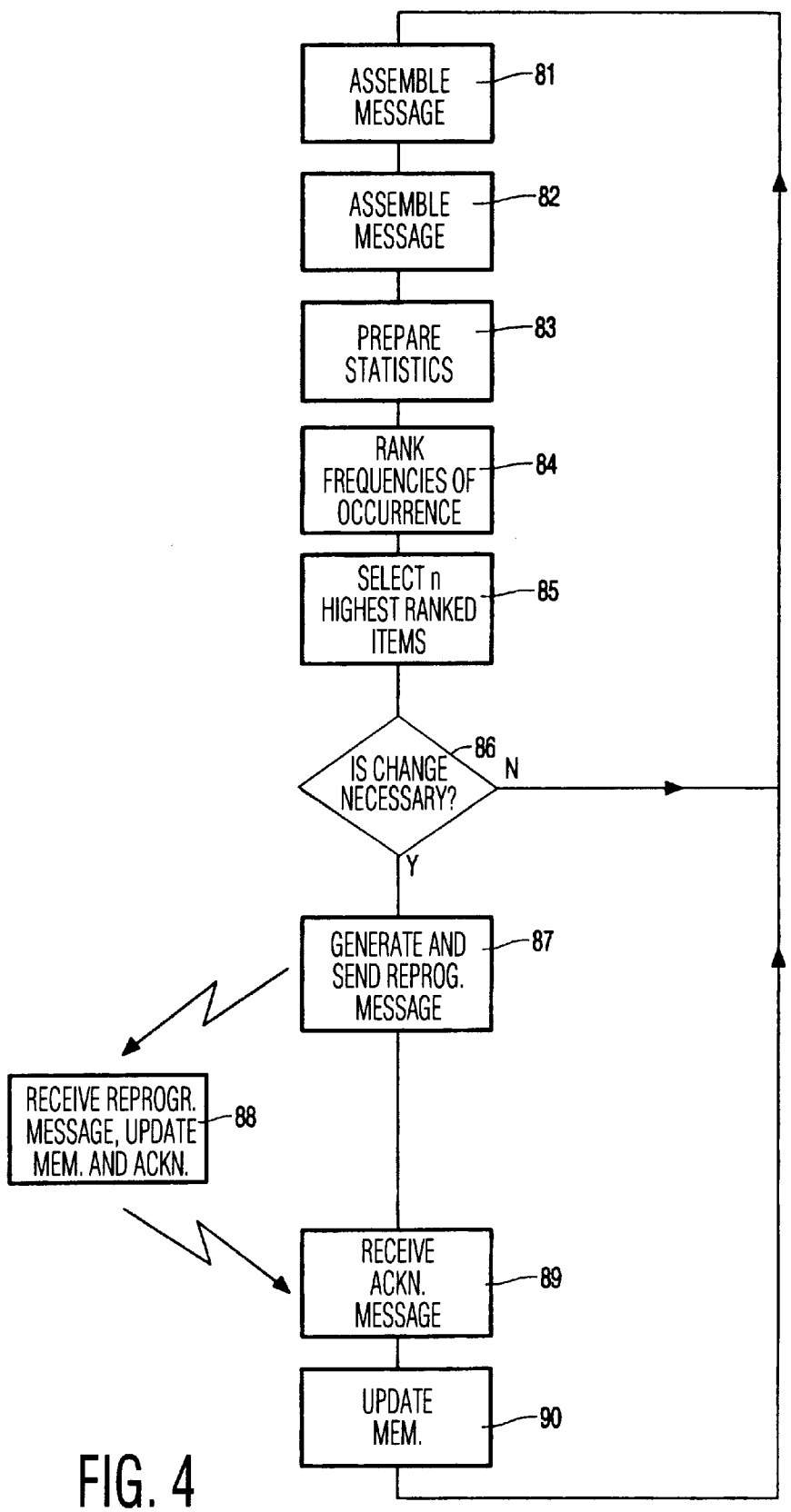
FIG. 4 is a flow chart relating to the operation of updating dynamically the PNC10 and a corresponding pager to take into account changes in the frequency of usage of items of numeric only, alpha-numeric or graphical data.

FIG. 4 is a flow chart illustrating the operations involved. Block 81 relates to the operation of the microprocessor 24 (FIG. 2) assembling a message. Block 82 denotes the microprocessor analysing the message being assembled. Block 83 relates to the microprocessor preparing statistics on the frequency of use of message items, for example telephone numbers, words or phrases. In block 84, the frequencies of occurrence of items are ranked from the highest to the lowest. In block 85 the n, where n is an integer, highest ranked items are selected and compared to the pre-stored items associated with that pager's RIC. In block 86 a check is made to see if any change is necessary to the items stored. If the answer is N (No) the flow chart reverts to the block 81. Alternatively if the answer is Y (Yes) then in block 87 the microprocessor 24 generates a reprogramming message which is sent to the addressed pager. Block 88 denotes the pager receiving the reprogramming message, updating its memory 80 and transmitting an automatically generated acknowledgement message. If the reprogramming message was corrupted, the pager will transmit a repeat message signal. In block 89, the PNC10 receives the acknowledgement from the pager and in block 90 it updates the relevant area A1 to An in its memory 46. Thereafter the flow chart reverts to the block 81.

Although the present invention has been described with reference to wide area digital paging, it can equally be applied to other two-way message transmission systems, in particular cordless and cellular telephone systems and private mobile radio systems.

From reading the present disclosure, other modifications will be apparent to persons skilled in the art. Such modifications may involve other features which are already known in the design, manufacture and use of message transmission systems and component parts thereof and which may be used instead of or in addition to features already described herein.

I claim:

1. A message transmission system comprising a primary station configured for transmitting point-to-point messages over a communications link and a plurality of secondary stations, each secondary station being configured for receiving messages from the primary station directed to the secondary station via the communications link, and having means for recovering the received messages and non-volatile memory means for storing n (where n is an integer) items of information most frequently used in the messages directed to the secondary station, each item of information being identifiable in a received message by memory location reference indicia appearing in place of the item, the primary station having storage means for storing for each secondary station, said n items of information most frequently used in messages directed to the secondary station, and their associated memory location reference indicia, the primary station being configured for, whenever appropriate, transmitting memory location reference indicia to the secondary station in place of an item of information which is one of the presently stored n items of information most frequently used in messages directed to the secondary station, the primary station having means for dynamically determining for each secondary station the n items of information most frequently used in the messages directed to the secondary station, and if any of the currently determined n items of information most frequently used in the messages directed to the secondary station is different from the presently stored n items of information most frequently used in the messages directed to the secondary station, forming and transmitting a programming/reprogramming message directed to the secondary station for updating the items of information stored in the memory means of the secondary station, and correspondingly updating the items of information stored in its storage means relating to the secondary station.

2. A system as claimed in claim 1, wherein each secondary station has means for transmitting an acknowledgement message in response to receipt of the programming/reprogramming message.

3. A system as claimed in claim 1, wherein the items of information are alpha-numeric or numeric only.

4. A system as claimed in claim 1, further comprising means for determining if complex graphical data is being transmitted in messages directed to a secondary station, and for causing said complex graphical data to be stored in the storage means in the primary station together with memory location reference indicia and in the non-volatile memory means in the secondary station together with the memory location reference indicia.

5. A method of operating a message transmission system comprising a primary station transmitting point-to-point messages over a communications link to selectively addressed ones of a plurality of secondary stations, the selectively addressed secondary stations receiving messages from the primary station and recovering the messages, the secondary station storing, in response to a programming/reprogramming message from the primary station, n (where n is an integer) items of information most frequently used in the messages addressed to the secondary station, each item to be identified in a received message by memory location reference indicia appearing in place of the item, the primary station storing, for each secondary station, said n items of information most frequently used in messages addressed to the secondary station and their associated memory location reference indicia, said primary station, whenever appropriate, transmitting memory location reference indicia to the secondary station in place of an item of information which is one of the presently stored n items of information most frequently used in messages addressed to the secondary station, wherein the primary station dynamically determines for each secondary station the n items of information most frequently used in messages addressed to the secondary station, and if any of the currently determined n items of information most frequently used in messages addressed to the secondary station is different from the presently stored n items of information most frequently used in messages addressed to the secondary station, the primary station forms and transmits a programming/reprogramming message addressed to the secondary station for updating the items of information stored by the secondary station, and correspondingly updates its own stored items of information relating to the secondary station.

6. A method as claimed in claim 5, wherein the secondary station transmits an acknowledgement signal in response to receipt of the reprogramming message.

7. A method as claimed in claim 5, wherein the items of information are alpha-numeric or numeric only.

8. A method as claimed in claim 5, further comprising determining if complex graphical data is being transmitted in messages addressed to a secondary station, and if so, causing said complex graphical data to be stored at the primary station and at the secondary station together with memory location reference indicia.

9. A primary station for use in a message transmission system comprising a primary station configured for transmitting point-to-point messages over a communications link and a plurality of secondary stations configured for receiving messages from the primary station directed to the secondary station via the communications link, the primary station comprising storage means for storing, for each secondary station, n (where n is an integer) items of information most frequently used in messages directed to the secondary station, and their associated memory location reference indicia, the primary station being configured for, whenever appropriate, transmitting memory location reference indicia to the secondary station in place of an item of information which is one of the presently stored n items of information most frequently used in messages directed to the secondary station, the primary station having means for dynamically determining for each secondary station the n items of information most frequently used in messages directed to the secondary station, and if any of the currently determined n items of information is different from the presently stored n items of information most frequently used in messages directed to the secondary station, forming and transmitting a programming/reprogramming message directed to the secondary station for updating the items of information stored in the secondary station and correspondingly updating the items of information stored in its storage means relating to the secondary station.

10. A primary station as claimed in claim 9, further comprising means for receiving an acknowledgement of receipt of the programming/reprogramming message from the secondary station.

* * * * *